United States Patent [19]

Parks

[11] Patent Number: 5,483,135

[45] Date of Patent: Jan. 9, 1996

[54] ADAPTIVE SYSTEM AND METHOD FOR CONTROLLING VEHICLE WINDOW OPERATION

[75] Inventor: Daniel R. Parks, Farmington, Mich.

[73] Assignee: Ford Motor Company, Dearborn, Mich.

[21] Appl. No.: 254,723

[22] Filed: Jun. 6, 1994

[51] Int. Cl.$^6$ ..................................... H02P 1/18
[52] U.S. Cl. .......................... 318/469; 318/281; 318/466
[58] Field of Search .................... 318/440–489, 318/560–646, DIG. 2; 49/28, 31, 349, 506; 15/250

[56] References Cited

U.S. PATENT DOCUMENTS

| | | | |
|---|---|---|---|
| 4,328,451 | 5/1982 | Barge | 318/596 |
| 4,347,465 | 8/1982 | Goertler et al. | 318/266 |
| 4,373,149 | 2/1983 | Coste | 318/281 |
| 4,468,596 | 8/1984 | Kinzl et al. | 318/287 |
| 4,608,637 | 8/1986 | Okuyama et al. | 364/424 |
| 4,611,154 | 9/1986 | Lambropoulos et al. | 318/490 |
| 4,641,067 | 2/1987 | Iizawa et al. | 318/287 |
| 4,706,194 | 11/1987 | Webb et al. | 318/466 |
| 4,831,509 | 5/1989 | Jones et al. | 364/167.01 |
| 4,870,333 | 9/1989 | Itoh et al. | 318/286 |
| 4,933,613 | 6/1990 | Berner et al. | 318/65 |
| 4,999,551 | 3/1991 | Yoshida et al. | 318/286 |
| 5,004,961 | 4/1991 | Berner et al. | 318/65 |
| 5,012,168 | 4/1991 | Dara et al. | 318/434 |
| 5,038,087 | 8/1991 | Archer et al. | 318/469 |
| 5,218,282 | 6/1993 | Duhame | 318/603 |
| 5,351,439 | 10/1994 | Takeda et al. | 49/28 |
| 5,382,890 | 1/1995 | Moh et al. | 318/254 |
| 5,399,950 | 3/1995 | Lu et al. | 318/565 |

FOREIGN PATENT DOCUMENTS

| | | |
|---|---|---|
| 0479045 | 4/1992 | European Pat. Off. . |
| 0525788 | 2/1993 | European Pat. Off. . |
| 59-61485 | 4/1984 | Japan . |
| 2023360 | 12/1982 | United Kingdom . |
| 2271863 | 4/1994 | United Kingdom . |

*Primary Examiner*—Paul Ip
*Attorney, Agent, or Firm*—Mark S. Sparschu; Roger L. May

[57] ABSTRACT

An adaptive control system and method for a vehicle window. The system and method include sensors for determining a motor current corresponding to a window position and for detecting a motor stall, and an electronic control module (ECM) for providing a position counter having a count representing the window position. The ECM is also provided for setting, independent of a dedicated motor actuation input signal, a second historical limit equal to the count when the window is driven by the motor toward the closed position and a motor stall is detected, as well as setting, independent of a motor actuation input signal, the second historical limit equal to the difference between the second historical limit and the count, and the count equal to a first historical limit, respectively, when the window is driven by the motor toward an open position and a motor stall is detected. The ECM is further provided for generating a first control signal operative to halt operation of the motor when the count equals the first historical limit, and generating a second control signal operative to halt operation of the motor when the count equals the second historical limit.

20 Claims, 3 Drawing Sheets

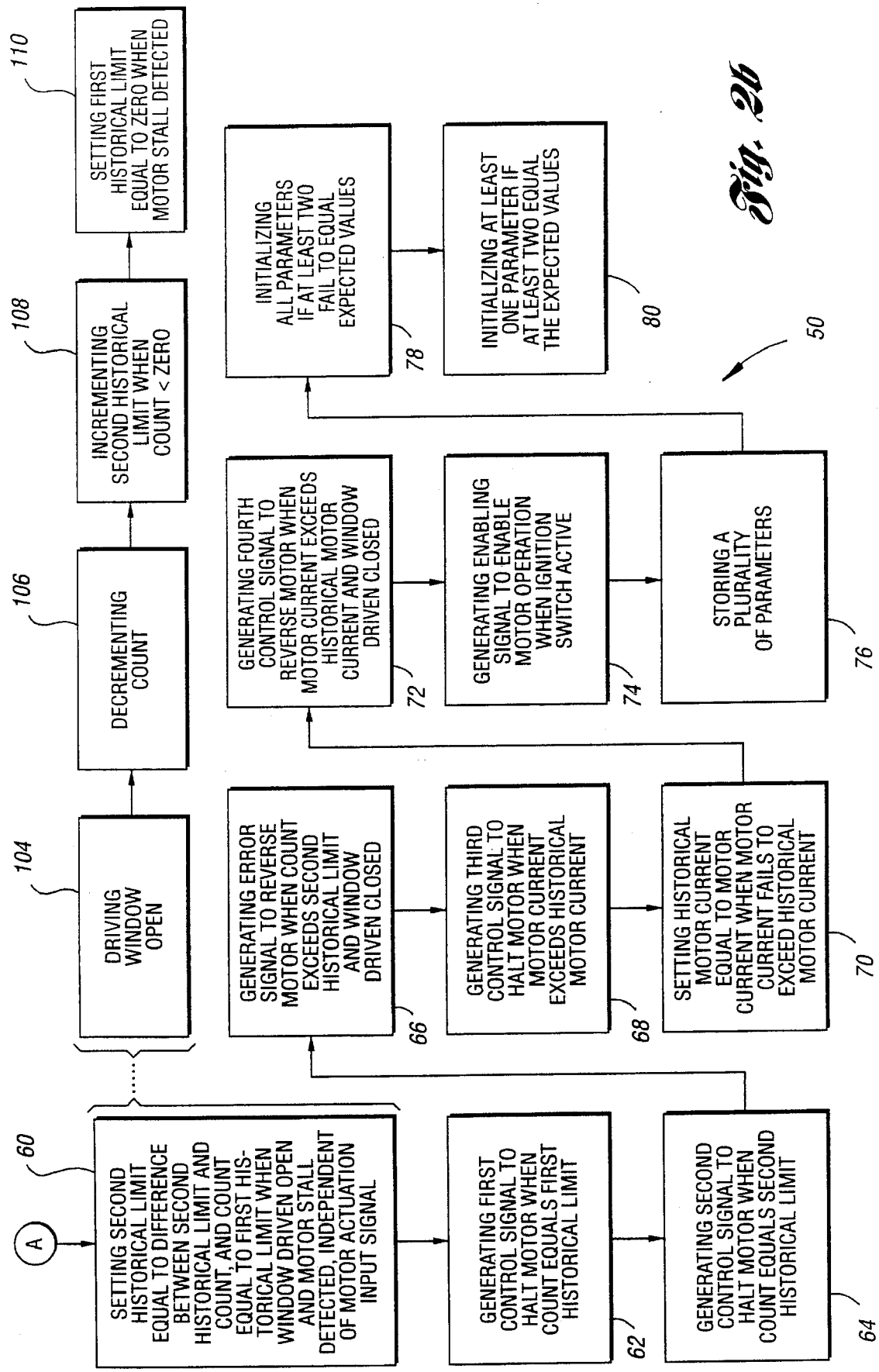

ADAPTIVE SYSTEM AND METHOD FOR CONTROLLING VEHICLE WINDOW OPERATION

TECHNICAL FIELD

This invention relates to an adaptive system and method for controlling operation of a vehicle window.

BACKGROUND ART

In recent years, a variety of control systems have been developed and are now in use for automotive vehicle windows. Such systems may include a number of features including blockage detection and "one touch" control.

Blockage detection in such systems may be accomplished by measuring motor current or motor speed changes. More specifically, a foreign object blocking window operation results in a higher current draw by the motor, as well as a slower motor speed. Either of these conditions can be detected to determine window blockage and to halt and/or reverse operation of the drive motor.

In many window control systems, a dedicated input from the window switch is required to continue operation of the window drive motor. However, with "one touch" control, the vehicle window may be driven to a completely open or closed position with only a single, momentary activation of the window switch. Such "one touch" controls are often integrated with the blockage detection feature described above.

However, most such window control systems lack the ability to adapt to changing conditions. More specifically, frictional and mechanical characteristics associated with the window may vary over time due to wear, vibration or other circumstances. Such varying characteristics cause changes in window size and drive motor currents, which are used to effectuate window control. Without the ability to adapt to such changes, many window control systems develop operational problems, including false blockage detection and the inability to completely open or close the window.

U.S. Pat. No. 4,608,637 issued to Okuyama et al. ("the Okuyama '637 patent") discloses a control device for driving road-vehicle electric powered equipment, such as a window. The control device of the Okuyama '637 patent includes a window travel limit adaptive ability and a motor current adaptive ability to overcome the problems described above concerning complete opening and closing of the window as well as false blockage detection.

However, the control device of the Okuyama '637 patent, like other adaptive window control systems, lacks the ability to adapt to travel limits during normal modes of operation. That is, existing adaptive control systems are only capable of adapting to travel limits during a learning mode of operation wherein a dedicated input from an operator is required. Moreover, the control device of the Okuyama '637 patent also lacks any error detection feature associated with its window travel limit adaptive ability.

Thus, there exists a need for a window control system and method having a window travel limit adaptive ability which is operative during the normal mode of window operation and absent a dedicated operator input. Still further, a need exists for a window control system with a window travel limit adaptive ability having an error detection feature associated therewith.

DISCLOSURE OF INVENTION

According to the present invention, then, a system and method are provided for controlling a vehicle window having an open position, a closed position, and an electric motor. The control system of the present invention comprises means for determining a motor current corresponding to a window position, means for detecting a motor stall, and a position counter having a count representing the window position. The system further comprises means for setting, independent of a dedicated motor actuation input signal, a second historical limit equal to the count when the window is driven by the motor toward the closed position and a motor stall is detected, as well as means for setting, independent of a dedicated motor actuation input signal, the second historical limit equal to the difference between the second historical limit and the count, and the count equal to a first historical limit, respectively, when the window is driven by the motor toward the open position and a motor stall is detected. The system still further comprises means for generating a first control signal operative to halt operation of the motor when the count equals the first historical limit and means for generating a second control signal operative to halt operation of the motor when the count equals the second historical limit.

The control method of the present invention comprises determining a motor current corresponding to a window position, detecting a motor stall, and providing a position counter having a count representing the window position. The method further comprises setting, independent of a dedicated motor actuation input signal, a second historical limit equal to the count when the window is driven by the motor toward the closed position and a motor stall is detected, as well as setting, independent of a dedicated motor actuation input signal, the second historical limit equal to the difference between the second historical limit and the count, and the count equal to a first historical limit, respectively, when the window is driven by the motor toward the open position and a motor stall is detected. The method still further comprises generating a first control signal operative to halt operation of the motor when the count equals the first historical limit, and generating a second control signal operative to halt operation of the motor when the count equals the second historical limit.

Accordingly, it is the principle object of the present invention to provide an improved adaptive system and method for controlling a vehicle window.

This and other objects, features and advantages will be readily apparent upon consideration of the following detailed description in conjunction with the accompanying drawings.

BRIEF DESCRIPTION OF DRAWINGS

FIGS. 2a and 2b are a block diagram of the adaptive method for controlling a vehicle window of the present invention.

BEST MODE FOR CARRYING OUT THE INVENTION

Figure 1:
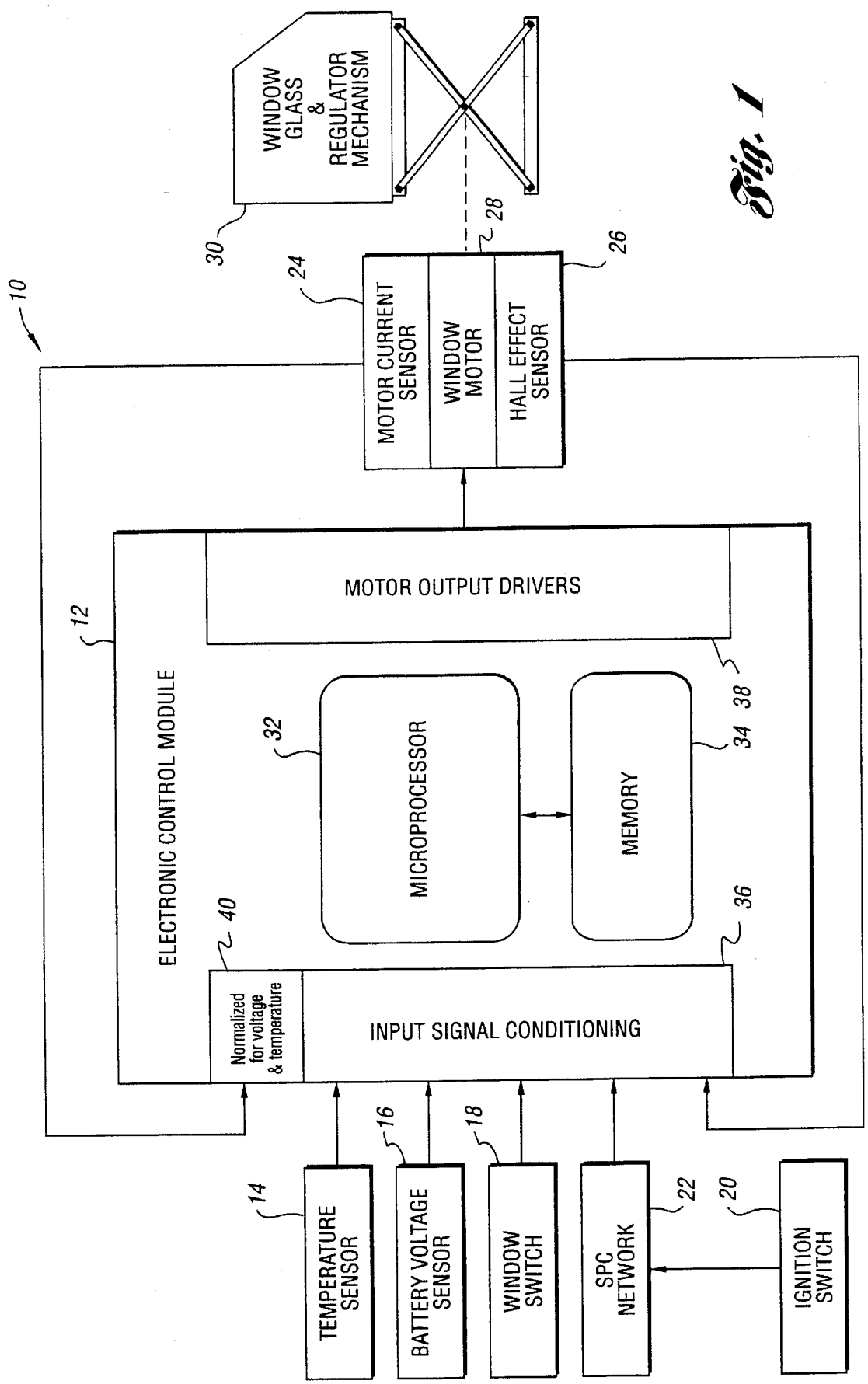
FIG. 1 is block diagram of the adaptive system for controlling a vehicle window of the present invention.

Referring first to FIG. 1, a block diagram of the adaptive system for controlling a vehicle window of the present invention is shown, denoted generally by reference numeral 10. As seen therein, the system (10) comprises an electronic control module (ECM) (12) provided in electrical communication with a temperature sensor (14), a battery voltage sensor (16), a window switch (18), an ignition switch (20) via an SCP network (22), a motor current sensor (24), a Hall effect sensor (26), and a window motor (28). Window motor (28) is itself provided in electrical communication with window glass and regulator mechanism (30) for driving the vehicle window according to the present invention.

ECM (12) is itself provided with a microprocessor (32), memory (34), input signal conditioning (36), and motor output drivers (38). Input signal conditioning (34) receives and conditions input signals from temperature sensor (14), battery voltage sensor (16), a window switch (18), ignition switch (20) via SCP network (22), motor current sensor (24), and Hall effect sensor (26). The signal conditioning, which will be described in greater detail below, includes normalization (40) of voltage and temperature signals.

In general, the present invention provides an automatic window opening/closing system (10) and method with adaptive ability. That is, the present invention has the ability to adapt to varying travel limits and, therefore, requires no dedicated sensors to detect end of travel. This ability allows the present invention to adapt not only to different window opening sizes, but also to wear in the mechanism, environmental changes, deformities in the travel path, and other circumstances.

The present invention also has the ability to adapt to varying opening and closing efforts. This is accomplished through the use of a threshold which can vary as needed to adapt to changes in the environment. This ability allows the present invention to adapt to variances due to manufacturing tolerances, mechanism wear, environmental changes, deformities in travel path, and other circumstances.

Finally, the present invention also provides automatic tracking of travel limits by incorporating a mode for establishing travel limits into the normal operating condition. This ability allows the present invention to learn the travel limits and to adapt to changes therein without requiring a special purpose, dedicated input from the operator.

More specifically, the operation of power windows may be subject to governmental requirements. As a result, the present invention must determine when window operation should be enabled or disabled. This depends upon the position of ignition switch (20). The position of ignition switch (20) may be sensed directly by the door module. Preferably, however, the position of ignition switch (20) is detected via SCP network (22).

Ignition switch (20) serves to generate an input signal indicating when the vehicle ignition switch status is active or inactive. As used herein the vehicle ignition switch status is defined as active when the vehicle ignition switch (20) is in either a "run" or an "accessory" position. In either position, electrically powered vehicle systems, such as the system (10) of the present invention, are energized by either a generator or a battery. Conversely, the vehicle ignition status is defined as inactive when the vehicle ignition switch (20) is in any other position, such as an "off" or "start" position.

In that regard, window operation is disabled if the required data cannot be obtained over SCP network (22). Following any reset of ECM (12), which will be described in greater detail below, ECM (12) will perform a function read of the status of ignition switch (20). If ECM (12) gets a response that ignition switch (20) is in the "accessory" or the "run" position, ECM (12) will generate an enabling signal to enable window operation and turn on the window logic output. Thereafter, ECM (12) will check and refresh the status of ignition switch (20) every one half second. In this fashion, ECM (12) keeps the most current copy of the data. If at any time the refresh process cannot get a valid response from ignition switch (20), the window logic output is turned off and window operation is disabled. When ECM (12) determines that ignition switch (20) has moved into an "off" or "start" position, or when ECM (12) is unable to determine the position of ignition switch (20), the window logic output is turned off and the window operation is disabled until the ignition switch (20) is in either the "accessory" or "run" position again.

With regard to initialization, there are two possible ways in which the system (10) is initialized. The first is referred to as a "cold" reset, and the second is referred to as a "warm" reset. Cold resets are associated with a loss of supply voltage to ECM (12) which is sufficient to corrupt the random access memory (RAM) (34). Warm resets are those in which the RAM (34) is not corrupted.

The determination as to which type of reset has occurred is made shortly after reset. ECM (12) uses a number of RAM (34) locations (preferably four bytes) which are used to hold known values, or parameters. These values are chosen to represent a certain pattern which is statistically unlikely to occur in consecutive, uninitialized RAM (34). These locations are used to validate the contents of the RAM (34) and they are examined following any reset. If any of the locations do not contain the expected values, then a cold reset is declared and a complete initialization of ECM (12) and all its values will occur. If, on the other hand, all of the locations contain the expected values, then a warm reset is declared, and only a subset of the complete initialization occurs.

Upon warm reset, RAM (34) is set to the following values:

All window motor outputs=OFF;
All window switch inputs=SW_IDLE
All window switch modes=SW_IDLE
global_motion_req=GLOBAL_IDLE
global_delay_tmr=0
win_pwr_state_=WIN_PWR_OFF
win_pwr_tmr=0
timer_over_flow=0
PFD_window_tmr=0;
PRD_window_tmr=0;

The following variables are initialized for both front & rear windows:

motion_state=WIN_STOP
control_mode=WIN_IDLE
motion_req=SW_IDLE
motion_tmr=0
block_tmr=0
global_tmr=0
flags=0

A cold reset causes all of the warm reset values noted above, as well as the following:

current window position=0
window size=0

With regard to sensor signal processing, ECM (12) relies upon four input variables to provide a "one touch up" operation mode. The four variables are battery voltage, module temperature, window motor current, and Hall effect sensor rotation pulses. The first three measurements are made via A/D inputs, while the Hall pulses are detected via input captured interrupts.

All A/D measurements are eight bits in precision and are relative to a regulated five bolt reference. This yields the following A/D resolution:

$2^8 \text{bits}/5.0 \text{ volts} = 256 \text{ bits}/5.0 \text{ volts} = 51.2 \text{ bits/vol}$ This is rounded to 51 bits/volt due to the finite precision integer arithmetic.

The battery voltage measurement is relative to the voltage input to ECM (12) and is determined by the following relationship:

$$V_{A/D} = (V_{BATT} - 0.7 \text{ volts})/(22.1K + 8.45K) * 8.45K$$

The A/D reading will saturate at 5 volts which corresponds to 18.77 volts for the battery voltage. Window motor outputs are not energized when battery voltage is less than 9 volts or greater than 17 volts. There is approximately 0.75 volts of hysteresis at both extremes in the battery voltage limit checking. The battery voltage reading is filtered by 25-75 IIR filter (e.g., one part new data, three parts old).

The temperature signal voltage is generated by a thermistor circuit. This measurement represents the module internal temperature and as such it does not exactly track the ambient temperature present at the window glass. The range of temperature measurement is −40° C. to 80° C. The temperature reading is filtered by a 50-50 IIR filter.

The window motor current is measure via a series resistor in the ground return of the motor. This voltage is then conditioned by a current sense amplifier which amplifies the voltage and filters commutator noise from the signal. The transfer function of the current sense amplifier is approximately 6.9 A/D counts per amp. Since the A/D reading will saturate at 5 volts, the maximum current which can be resolved is approximately 37.1 amps.

The window motor current is filtered by an eight sample moving average filter (an FIR digital filter). Eight samples is preferred since the power-of-two eases computation. Additionally, using a multiple of four samples helps reduce the effects of the non-symmetrical duty cycle of the quadrature signal from the Hall effect sensors, described below. In other words, if two Hall sensors are installed such that they are not exactly 90° apart, a non-symmetrical duty cycle will be produced. By averaging together a multiple of four edges, the non-symmetry is removed from further calculations. While this is especially important in pulse-width measurement systems, it is still helpful for current-sensing systems such as that of the present invention.

Motor rotation pulses are generated by Hall effect sensors on the motor shaft. The sensors provide two channels of pulses in quadrature relationship. These pulses are detected with the input capture interrupts of a 68HC11 integrated circuit. Four edges represent one complete rotation of window motor (28). An interrupt is generated for every edge (both rising and falling) for each of the two channels. With an ordinary production window motor (28), approximately 1120 edges are detected during a complete movement of the window.

The amount of linear displacement of the window glass during one rotation of motor (28) depends upon where the window is in its range of travel. The displacement per revolution at the upper and lower ends of travel is smaller than the displacement over the middle portion of the travel range. This is due to the angular movement of the scissor portion of window glass and regulator mechanism (30). At the extremes, the displacement is approximately 1.4 mm per motor revolution, or about 0.35 mm per pulse. Over the middle of the travel range, the displacement is approximately 2.1 mm per motor revolution or about 0.525 mm per pulse.

The position of the upper edge of the window glass is tracked by counting the pulses as they occur. A fully opened window is at position zero, which may be referred to as a first historical limit. A fully closed window is at position 1120 (approximately), which may be referred to as a window size or a second historical limit. Therefore, when the window is moving downward, the position counter is decremented for each pulse. When the window is moving upward, the position counter is incremented for each pulse.

In this fashion, the window is controlled such that when the window is moving upward and the position counter reaches 1120, ECM (12) generates a control signal operative to halt motor (28) operation since the window is completely closed. Similarly, when the window is moving downward and the position counter reaches zero, ECM (12) again generates a control signal operative to halt motor (28) operation since the window is completely open.

The direction of motor rotation is determined by looking at the port pins for the quadrature signal. It is important to use the direction information from the sensor because even though the system (10) may have set the motor outputs to command rotation in one direction, the motor may still be rotating in the opposite direction due to inertia. This helps to prevent from accumulating errors in the position. However, in the event direction information from the sensor is not used, any accumulated errors will eventually be accounted for and corrected via an error signal which is described in greater detail below.

To compensate for the effects of changing temperature and/or battery voltage without having to learn a curve for every operating condition, the current from motor (28) is normalized. Normalization is done by adjusting the presently observed value for motor current to an equivalent value at a standard set of operating conditions. All motor current values used in the present invention are normalized by this method (working values, historical values, and block thresholds).

Normalization is performed by computing a value which represents the offset expected between normalized current and the motor current which should result from the present operating voltage and temperature. The equation was determined by statistical analysis performed on data collected from an experimental population of 25 samples. The offset is calculated by an interpolation into piece-wise curve which preferable consists of five segments. This offset is used in the equation for expected or predicted motor current (PMC) as follows:

$$PMC = LCT + 211.9/(\text{temperature} + 54° \text{ C.}) + (0.085 * V_{BATT})$$

where LCT represents "learned current term", or the current corresponding to frictional or mechanical characteristics for the particular door and which has been observed during previous window movements. The remaining two terms represent the voltage/current offset, which is referred to as vt_current_offset. As is readily apparent to hose of ordinary skill in the art, vt_current_offset is dependant upon the specific window motor (28) employed as part of the system (10) of the present invention.

With respect to adaptive ability, or "learning", the present invention is able to automatically adapt to the size of the window. As mentioned above, the current window position and size are set to zero following any cold reset. At this point, the adaptive ability of the present invention takes over.

More specifically, as the window is moved downward from its initial position, the system (10) decrements the position counter. However, since the initial position is 0, the new position is now −1, and the system (10) does not allow negative positions. Instead, the position is reset to zero and the size is incremented by one. In this way the window size increases in proportion to the downward displacement.

As the window is moved upwards, the system (10) increments the position counter and compares the position counter with the window size. If the position counter is greater than the size, the window has moved above the expected size and the size is adjusted accordingly. In this way, the window size will increase in proportion to the upward displacement.

The learning of the window size is complete when the window has been driven into stall at both the upper and lower ends of travel. This is preferably detected by a lack of motor rotation as evidenced by observing the absence of pulses from Hall effect sensor (26) for a given time period (preferably approximately (0.4 seconds Alternatively, however, motor stall may be detected by observing motor stall current for a given time period (preferably approximately 0.5 seconds). In either embodiment, motor stall detection can occur in either a manual-up, manual-down or one touch-down mode.

If a motor stall is detected during downward movement, and the position counter has not yet reached zero, the system (10) assumes that the position and size are in error. The system will decrement the window size by the amount remaining in the position counter, and will then set the position counter to zero. In this way, the system (10) can adapt to decreasing window sizes.

A similar adjustment is made during motor stalls during upward movement. If the stall occurs when the position counter is less than the window size, the size is set equal to the value of the position counter. The position counter is not adjusted. Again, this allows the system (10) to adapt to decreasing window sizes.

The operator is allowed to perform one-touch up window movements as long as the current window position is less than the window size. If, during a one-touch up movement the position becomes greater than the window size by a certain amount (preferably 16 counts), an error is assumed to have occurred. In that event, ECM (12) generates an error signal such that the window will be reversed and driven down to the lower end of travel, where the zero position and size are reestablished as described above.

In this fashion, any accumulated error resulting from failure to use motor direction information from the sensors, as described above, is eliminated. Similarly, an error in setting window size may be caused by a motor current that exceeds the stall current before the window actually reaches a limit position, either completely closed or completely open. In that event, the error signal generation described above will again act to eliminate such error by resetting window position and size, again as described above.

The present invention also has the ability to adapt to, or "learn," different values of motor current over the travel range of the window. In this way, the system (10) can adapt to differences due to manufacturing, aging, seal deformities, small objects, or other circumstances.

More specifically, the travel range is divided into 32 segments. During every input capture interrupt, a segment is selected based upon the current window position. The value of the motor current is filtered into a "bin", or storage location, which corresponds to this segment. This filtering allows the rate of learning to be controlled.

Each bin contains the averaged, normalized value for the running current of the motor in that segment of window travel (i.e., "bin"). One set of bins (referred to as the "working buffer," or the detected motor currents) is used to monitor the motor currents during any given movement of the window, and another set of bins (referred to as the "historical buffer," or historical motor currents) is used to store motor currents which were observed only during "good", or non-blocked, movements of the window.

If a given window movement completes without encountering an object (bouncing back), the values in the working buffer are allowed to remain there until the next motion starts. When the next motion starts sometime in the future, the observations which were learned from the previous movement are copied into the historical buffer. If, on the other hand, a blocking object is detected during the one-touch up movement, the values in the working buffer are discarded, since the system (10) does not want to learn the characteristics of blocked motion.

For more effective operation, the system (10) specifically does not learn values for in-rush current or for coasting (free-wheeling) current. Furthermore, learning only occurs during upward movements of the window. This is because many motors (28) exhibit a substantially lower average current when being driven downward then when driven upward. If the difference between upward and downward current is large enough, nuisance bounce-backs are generated.

Finally, the system (10) is preferably designed to detect block forces of 50 Newtons. Blocking forces will appear to the system (10) as an increase in motor running current. From statistical analysis, the increase was determined to be a constant offset which is independent of temperature and supply voltage.

Block detection is accomplished by comparing the observed current with the predicted current. If they differ by more than a certain threshold, a block is assumed to be occurring. More specifically, a block is detected if the sum of the historically observed motor current and a threshold value (block detect threshold) is less than the difference between the filtered present motor operating current and the offset, vt__current__offset, described above. This comparison is made each time an edge for the Hall sensor (26) is detected, but a direction reversal of motor (28) is made only if the window is moving in one touch-up mode. A block detect threshold represents approximately 2.6 amps which corresponds to 50 Newtons.

Generally, upon detection of a block, ECM (12) generates a control signal operative to halt motor (28) operation and thus window movement. In one-touch up operation, however, upon detection of a block, ECM (12) generates a control signal operative to reverse motor (28) operation and drive the window toward its open position.

Figure 2A:
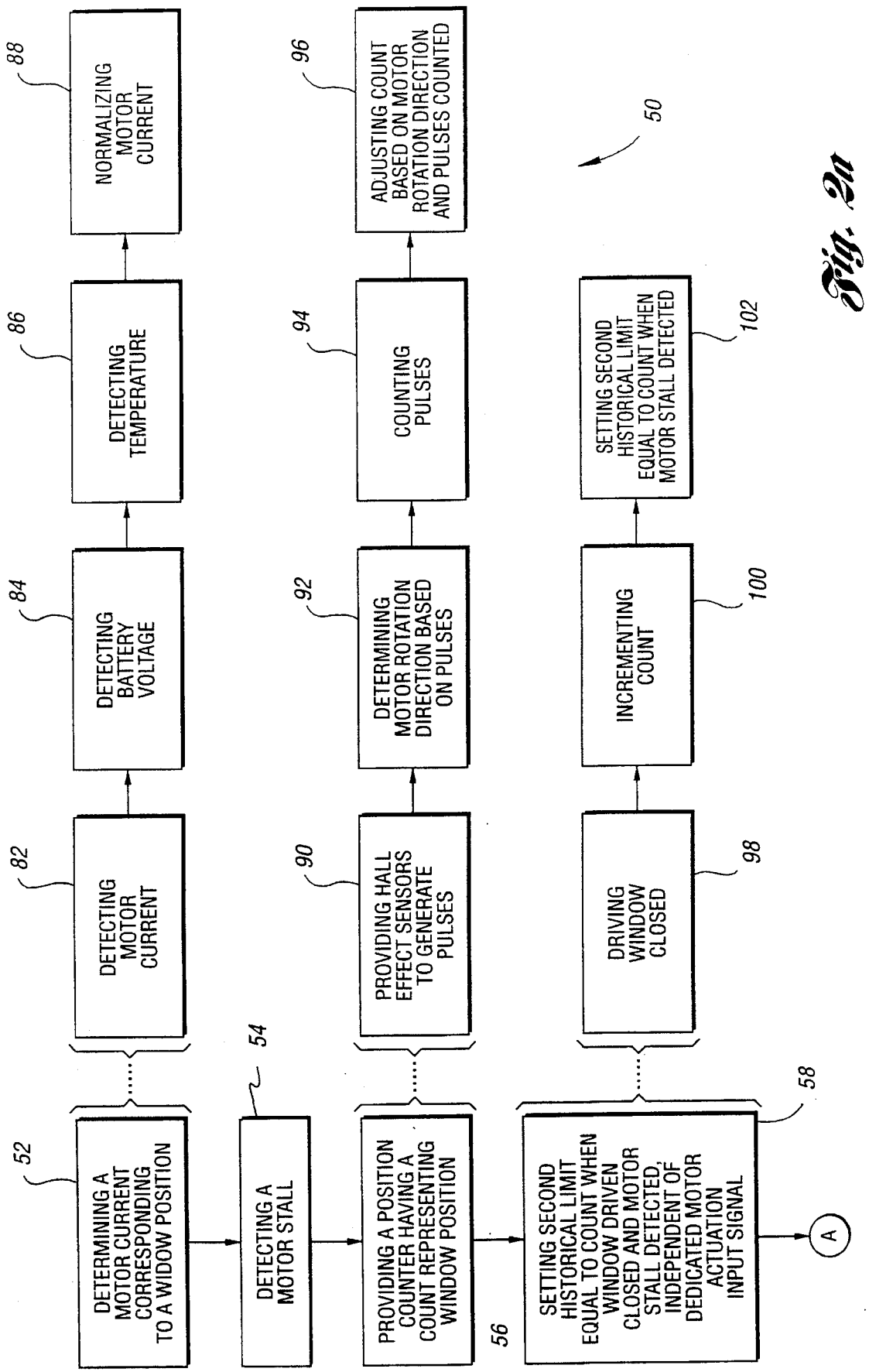

Referring now to FIGS. 2a and 2b, a block diagram of the adaptive method for controlling a vehicle window of the present invention is shown, denoted generally by reference numeral (50). The method (50) is provided for controlling a window in a vehicle having an ignition switch, the window having an open position, a closed position, and an electric motor.

As seen therein, the method comprises determining (52) a motor current corresponding to a window position, detecting (54) a motor stall, and providing (56) a position counter having a count representing the window position. The method further comprises setting (58), independent of a dedicated motor actuation input signal, a second historical limit equal to the count when the window is driven by the motor toward the closed position and a motor stall is detected, as well as setting (60), independent of a dedicated motor actuation input signal, the second historical limit equal to the difference between the second historical limit and the count, and the count equal to a first historical limit, respectively, when the window is driven by the motor toward the open position and a motor stall is detected. The method still further comprises generating (62) a first control signal operative to halt operation of the motor when the count equals the first historical limit, and generating (64) a second control signal operative to halt operation of the motor when the count equals the second historical limit.

The vehicle window adaptive control method (50) of the present invention may further comprise generating (66) an error signal operative to reverse operation of the motor when the count exceeds the second historical limit by a selected amount and the window is driven by the motor toward the closed position. Still further, the method (50) may also comprise generating (68) a third control signal operative to halt operation of the motor when the determined motor current exceeds an historical motor current by a selected value, and setting (70) the historical motor current equal to the determined motor current when the determined motor current fails to exceed the historical motor current by the selected value. Still further, the method (50) may comprise generating (72) a fourth control signal operative to reverse operation of the motor when the detected motor current exceeds the historical motor current by a selected value and the window is driven by the motor toward the closed position.

The adaptive window control method (50) may further comprise generating (74) an enabling signal to enable operation of the motor only when a vehicle ignition switch has an active status. Still further, the method (50) may comprise storing (76) a plurality of parameters, initializing (78) all of the plurality of parameters if at least two of the parameters fail to equal corresponding expected values, and initializing (80) at least one of the plurality of parameters if the at least two of the parameters equal the corresponding expected values.

Still referring to FIGS. 2a and 2b, determining (52) a motor current itself may comprise detecting (82) a motor current, detecting (84) a battery voltage, detecting (86) a temperature, and normalizing (88) the detected motor current based on the detected voltage and temperature. In that same regard, providing (56) a position counter having a count representing the window position may itself comprise providing (90) a plurality of Hall effect sensors in the motor, the sensors adapted to generate two channels of pulses in quadrature relationship, determining (92) the direction of motor rotation based on the quadrature pulses, counting (94) the pulses produced by the sensors during motor rotation, and adjusting (96) the count based on the direction of motor rotation determined and the pulses counted.

Similarly, setting (58), independent of a dedicated motor actuation input signal, a second historical limit equal to the count when the window is driven by the motor toward the closed position and a motor stall is detected may itself comprise, to establish the second historical limit, driving (98) the window toward the closed position, incrementing (100) the count, and setting (102) the second historical limit equal to the count when a motor stall is detected. Finally, setting (60), independent of a dedicated motor actuation input signal, the second historical limit equal to the difference between the second historical limit and the count, and the count equal to a first historical limit, respectively, when the window is driven by the motor toward the open position and a motor stall is detected may itself comprise, to establish the first historical limit, driving (104) the window toward the open position, decrementing (106) the count, incrementing (108) the second historical limit when the decremented count is less than zero, and setting (110) the first historical limit equal to zero when a motor stall is detected.

The adaptive control system (10) and method (50) of the present invention have been described and shown herein in conjunction with the operation of a vehicle window. As used herein, a vehicle window is defined as any electrically operable reciprocating unit. Thus, it should be readily apparent that the adaptive control system (10) and method (50) of the present invention are suitable for use in any application where electrical operation of a reciprocating unit, such as a vehicle sliding roof, may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

I claim:

1. An adaptive system for controlling a vehicle window having an open position, a closed position, and an electric motor, the system comprising:

means for detecting a motor stall;

a position counter having a count representing a window position;

means for setting, independent of a dedicated motor actuation input signal, a first historical limit equal to the count when the window is driven by the motor toward the closed position an a motor stall is detected;

means for setting, independent of a dedicated motor actuation input signal, the first historical limit equal to the difference between the first historical limit and the count, and the count equal to a second historical limit, respectively, when the window is driven by the motor toward the open position and a motor stall is detected;

means for generating an error signal when the count exceeds the first historical limit by a selected amount and the window is driven by the motor toward the closed position, the error signal operative to reverse operation of the motor such that the first historical limit and the count may be reset by the means for setting the first historical limit and the count;

means for generating a first control signal operative to halt operation of the motor when the count equals the first historical limit; and means for generating a second control signal operative to halt operation of the motor when the count equals the second historical limit.

2. The system of claim 1 further comprising means for generating an error signal operative to reverse operation of the motor when the count exceeds the second historical limit by a selected amount and the window is driven by the motor toward the closed position.

3. The system of claim 1 further comprising:

means for determining a motor current;

means for generating a third control signal operative to halt operation of the motor when the determined motor current exceeds an historical motor current by a selected value; and means for setting the historical motor current equal to the determined motor current when the determined motor current fails to exceed the historical motor current by the selected value.

4. The system of claim 3 further comprising means for generating a fourth control signal operative to reverse operation of the motor when the detected motor current exceeds the historical motor current by a selected value and the window is driven by the motor toward the closed position.

5. The system of claim 4 further comprising means for generating an enabling signal to enable operation of the motor only when a vehicle ignition switch has an active status.

6. The system of claim 5 further comprising:
a memory for storing a plurality of parameters;
means for initializing all of the plurality of parameters if at least two of the parameters fail to equal corresponding expected values; and
means for initializing at least one of the plurality of parameters if the at least two of the parameters equal the corresponding expected values.

7. The system of claim wherein the means for determining a motor current comprises:
means for detecting a motor current;
means for detecting a battery voltage;
means for detecting a motor temperature; and
means for normalizing the detected motor current based on the detected voltage and temperature.

8. The system of claim 1 wherein the position counter having a count representing the window position comprises:
a plurality of Hall effect sensors in the motor, the sensors adapted to generate two channels of pulses in quadrature relationship;
means for determining the direction of motor rotation based on the quadrature pulses;
means for counting the pulses produced by the sensors during motor rotation; and
means for adjusting the count based on the direction of motor rotation determined and the pulses counted.

9. The system of claim 1 wherein the means for setting, independent of a dedicated motor actuation input signal, a first historical limit equal to the count when the window is driven by the motor toward the closed position and a motor stall is detected comprises:
means for driving the window toward the closed position;
means for incrementing the count; and
means for setting the first historical limit equal to the count when the motor stall is detected.

10. The system of claim 1 wherein the means for setting, independent of a dedicated motor actuation input signal, the first historical limit equal to the difference between the first historical limit and the count, and the count equal to a second historical limit, respectively, when the window is driven by the motor toward the open position and a motor stall is detected comprises:
means for driving the window toward the open position;
means for decrementing the count;
means for incrementing the first historical limit when the decremented count is less than zero; and
means for setting the second historical limit equal to zero when the motor stall is detected.

11. An adaptive method for controlling a vehicle window having an open position, a closed position, and an electric motor, the method comprising:
detecting a motor stall;
providing a position counter having a count representing window position;

setting, independent of a dedicated motor actuation input signal, a first historical limit equal to the count when the window is driven by the motor toward the closed position an a motor stall is detected;
setting, independent of a dedicated motor actuation input signal, the first historical limit equal to the difference between the first historical limit and the count, and the count equal to a second historical limit, respectively, when the window is driven by the motor toward the open position and a motor stall is detected;
generating an error signal when the count exceeds the first historical limit by a selected amount and the window is driven by the motor toward the closed position, the error signal operative to reverse operation of the motor such that the first historical limit and the count may be re-set;
generating a first control signal operative to halt operation of the motor when the count equals the first historical limit; and
generating a second control signal operative to halt operation of the motor when the count equals the second historical limit.

12. The method of claim 11 further comprising generating an error signal operative to reverse operation of the motor when the count exceeds the second historical limit by a selected amount and the window is driven by the motor toward the closed position.

13. The method of claim 11 further comprising:
determining a motor current;
generating a third control signal operative to halt operation of the motor when the determined motor current exceeds an historical motor current by a selected value; and
setting the historical motor current equal to the determined motor current when the determined motor current fails to exceed the historical motor current by the selected value.

14. The method of claim 13 further comprising generating a fourth control signal operative to reverse operation of the motor when the detected motor current exceeds the historical motor current by a selected value and the window is driven by the motor toward the closed position.

15. The method of claim 14 further comprising generating an enabling signal to enable operation of the motor only when a vehicle ignition switch has an active status.

16. The method of claim 15 further comprising:
storing a plurality of parameters;
initializing all of the plurality of parameters if at least two of the parameters fail to equal corresponding expected values; and
initializing at least one of the plurality of parameters if the at least two of the parameters equal the corresponding expected values.

17. The method of claim 13 wherein determining a motor current comprises:
detecting a motor current;
detecting a battery voltage;
detecting a motor temperature; and
normalizing the detected motor current based on the detected voltage and temperature.

18. The method of claim, 11 wherein providing a position counter having a count representing the window position comprises:
providing a plurality of Hall effect sensors in the motor, the sensors adapted to generate two channels of pulses in quadrature relationship;

determining the direction of motor rotation based on the quadrature pulses;

counting the pulses produced by the sensors during motor rotation; and adjusting the count based on the direction of motor rotation determined and the pulses counted.

19. The method of claim 11 wherein setting, independent of a dedicated motor actuation input signal, a first historical limit equal to the count when the window is driven by the motor toward the closed position and a motor stall is detected comprises:

driving the window toward the closed position;

incrementing the count; and setting the first historical limit equal to the count when the motor stall is detected.

20. The method of claim 11 wherein setting, independent of a dedicated motor actuation input signal the first historical limit equal to the difference between the first historical limit and the count, and the count equal to a second historical limit, respectively, when the window is driven by the motor toward the open position and a motor stall is detected comprises:

driving the window toward the open position;

decrementing the count;

incrementing the first historical limit when the decremented count is less than zero; and setting the second historical limit equal to zero when the motor stall is detected.

* * * * *